United States Patent
Muto

(10) Patent No.: US 8,196,190 B2
(45) Date of Patent: Jun. 5, 2012

(54) AUTHENTICATION SERVER, AUTHENTICATION SYSTEM AND ACCOUNT MAINTENANCE METHOD

(75) Inventor: Tsuyoshi Muto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 772 days.

(21) Appl. No.: 12/367,022

(22) Filed: Feb. 6, 2009

(65) Prior Publication Data

US 2009/0199280 A1    Aug. 6, 2009

(30) Foreign Application Priority Data

Feb. 6, 2008    (JP) ................................. 2008-026901

(51) Int. Cl.
*G06F 7/04*   (2006.01)
*H04L 29/06*  (2006.01)

(52) U.S. Cl. ........................................... 726/6; 713/159

(58) Field of Classification Search ........................ None
See application file for complete search history.

(56) References Cited

U.S. PATENT DOCUMENTS

| 7,640,360 | B1 * | 12/2009 | Kawamoto et al. ........... 709/246 |
| 2005/0033994 | A1 * | 2/2005 | Suzuki ........................ 713/202 |
| 2006/0026434 | A1 * | 2/2006 | Yoshida et al. ............... 713/182 |
| 2006/0271781 | A1 * | 11/2006 | Murakawa .................... 713/168 |
| 2008/0068642 | A1 * | 3/2008 | Takahashi ................... 358/1.15 |
| 2008/0185433 | A1 * | 8/2008 | Ando et al. ................... 235/439 |
| 2009/0119395 | A1 * | 5/2009 | Kodama ....................... 709/223 |

FOREIGN PATENT DOCUMENTS

| JP | 10-307793 | 11/1998 |
| JP | 2006-270353 | 10/2006 |

* cited by examiner

*Primary Examiner* — Nathan Flynn
*Assistant Examiner* — Abdullah Almamun
(74) *Attorney, Agent, or Firm* — Carter, DeLuca, Farrell & Schmidt LLP

(57) ABSTRACT

An authentication server, on receipt of a request to delete a user account, determines whether the account exists in a user authentication table. If the account exists, the authentication server deletes the account, and retrieves, from a requesters list in which information of devices from which users have to date requested user authentication is saved, an address of a device from which the user targeted for deletion has previously issued an authentication request, and issues a deletion request to that device together with account information. Similar processing to change a user account is performed in response to a change request.

15 Claims, 17 Drawing Sheets

FIG. 5

| USER ID (2011) | PASSWORD (2012) | HOME DIRECTORY (2013) |
|---|---|---|
| system | ******** | / |
| guest | ******** | /guest |
| tetsuya | ******** | /home/tetsuya |
| ... | ... | ... |
| koji | ******** | /home/koji |
| sayuri | ******** | /home/sayuri |
| may | ******** | /home/may |
| ... | ... | ... |
| yayoi | ******** | /home/yayoi |

| IP ADDRESS (2021) | USER ID (2022) |
|---|---|
| 010.010.010.024 | koji |
| 010.010.013.150 | yayoi |
| 010.010.013.176 | yayoi |
| ⋮ | ⋮ |
| 010.010.013.150 | tetsuya |

2020

| IP ADDRESS | USER ID | HOME DIRECTORY |
|---|---|---|
| 010.010.013.150 | yayoi | /home/yayoi |
| 010.010.013.150 | tetsuya | /home/tetsuya |

FIG. 17

| IP ADDRESS | PRE-CHANGE USER ID | PRE-CHANGE HOME DIRECTORY | POST-CHANGE USER ID | POST-CHANGE HOME DIRECTORY |
|---|---|---|---|---|
| 010.010.013.177 | yayoi | /home/yayoi | koji | /home/yayoi |
| 010.010.013.198 | yayoi | /home/tetsuya | koji | /home/tetsuya |

AUTHENTICATION SERVER, AUTHENTICATION SYSTEM AND ACCOUNT MAINTENANCE METHOD

BACKGROUND OF THE INVENTION

1. Field of the Invention

The present invention relates to an authentication server, an authentication system and an account maintenance method, more specifically, managing user accounts in an integrated fashion, in a system in which information concerning users such as files belonging to users.

2. Description of the Related Art

Heretofore, image processing apparatuses such as image forming apparatuses have had a function of storing image data received from a host such as a personal computer or document image data read by a scanner on a hard disk or the like, and printing or displaying the stored image data at a later date. Such image data stored on a device is sometimes confidential information, and an increasing number of devices protect image data usage with an ID, password or the like for security protection.

There have also been inventions for preventing storage area wastage, unauthorized use of image data, and the like. Japanese Patent Laid-Open No. 2006-270353 discloses an invention for deleting all data related to a user account saved in an image processing apparatus when an operation is performed in the image processing apparatus to delete both the user account and data. However, with the method of disclosed in Japanese Patent Laid-Open No. 2006-270353, user account information such as IDs and passwords is managed by the individual devices, requiring the delete operation to be performed for each apparatus, and placing a heavy burden on the administrator.

On the other hand, Japanese Patent Laid-Open No. 10-307793 discloses that the names of work station terminals in which accounts are registered be managed using a user management table included in a virtual server. When a username (account) is input in a work station terminal, an inquiry is made to the virtual server as to whether the username is already registered, and an account is created if not registered.

While Japanese Patent Laid-Open No. 10-307793 discloses accounts being managed using the user management table of a virtual server, the specific processing procedure when deleting an account is not disclosed.

SUMMARY OF THE INVENTION

An object of the present invention is to efficiently delete information and to reduce omission in the deletion of information concerning a user targeted for deletion or change, even in the case where information concerning a user targeted for deletion or change is dispersed throughout a system constituted by a plurality of devices.

To solve the above problems, the present invention is provided with the following configurations.

An authentication server that performs user account maintenance and user authentication includes a storage unit, configured to store a user authentication table in which user account information is registered, a save unit, configured to, in response to a user authentication request, save information of a device that requests the user authentication in an authentication requesters list in association with information of a user that requested the user authentication, and a deletion unit, configured to, in response to a user account information deletion request, delete account information of a user targeted for deletion from the user authentication table, and issue a request to delete information related to the user targeted for deletion, to a device saved in the authentication requesters list in association with the user targeted for deletion.

Alternatively, an authentication server that performs user account maintenance and user authentication includes a storage unit, configured to store a user authentication table in which user account information is registered, a save unit, configured to, in response to a user authentication request, save information of a device that requested the user authentication in an authentication requesters list in association with information of a user that requested the user authentication, and a change unit, configured to, in response to a user account information change request, change account information of a user targeted for change in the user authentication table, and issue a request to change information related to the user targeted for change, to a device saved in the authentication requesters list in association with the user targeted for change.

Alternatively, in an authentication system in which an authentication server that performs user account maintenance and user authentication is connected to a terminal device to which a user inputs an authentication request, the authentication server includes a storage unit, configured to store a user authentication table in which user account information is registered, a save unit, configured to, in response to a user authentication request, save information of a device that requested the user authentication in an authentication requesters list in association with information of a user that requested the user authentication, a deletion unit, configured to, in response to a user account information deletion request, delete account information of a user targeted for deletion from the user authentication table, and issue a request to delete information related to the user targeted for deletion, to a device saved in the authentication requesters list in association with the user targeted for deletion, and a change unit, configured to, in response to a user account information change request, change account information of a user targeted for change in the user authentication table, and issue a request to change information related to the user targeted for change, to a device saved in the authentication requesters list in association with the user targeted for change. The terminal device is configured to, on receipt of a deletion request issued by the deletion unit, try to delete information related to the user targeted for deletion, and, if successful, transmit a response indicating that deletion succeeded to the authentication server, and on receipt of a change request issued by the change unit, try to change information related to the user targeted for change, and, if successful, transmit a response indicating that change succeeded to the authentication server.

Alternatively, an account maintenance method in an authentication server that performs user account maintenance and user authentication includes the steps of saving, in response to a user authentication request, information of a device that requests the user authentication in an authentication requesters list in association with information of a user that requested the user authentication, and deleting, in response to a user account information deletion request, account information of a user targeted for deletion from a user authentication table in which user account information is registered, and issues a request to delete information related to the user targeted for deletion, to a device saved in the authentication requesters list in association with the user targeted for deletion.

Alternatively, an account maintenance method in an authentication server that performs user account maintenance and user authentication includes the steps of saving, in response to a user authentication request, information of a device that requests the user authentication in an authentication requesters list in association with information of a user that requested the user authentication, and changing, in response to a user account information change request, account information of a user targeted for change in a user authentication table in which user account information is registered, and issues a request to change information related to the user targeted for change, to a device saved in the authentication requesters list in association with the user targeted for change.

According to the above configurations, even if user files such as image data related to a user (account) remain dispersed throughout a plurality of image processing apparatuses, account deletion can be instructed efficiently without omission, enabling the burden on the system administrator to be reduced.

Also, even if an instruction to delete an account cannot be transmitted to image processing apparatuses, omission in the deletion of a user account and user files such as image data can be prevented by printing a list of devices to which the instruction could not be transmitted or retransmitting the instruction to those devices.

Further features of the present invention will become apparent from the following description of exemplary embodiments with reference to the attached drawings.

BRIEF DESCRIPTION OF THE DRAWINGS

FIG. 5 represents a data structure held on an HDD of an authentication server 1014 in order to manage user account information.

FIG. 6 represents a screen displayed on a touch panel 203 of an operation unit 200 when logging in.

FIG. 8 represents a data structure held on an HDD of the authentication server 1014 in order to manage information on authentication requesters.

FIG. 17 represents a data structure held on an HDD of the authentication server 1014 in order to manage information with respect to which account change failed.

DESCRIPTION OF THE EMBODIMENTS

Figure 1:
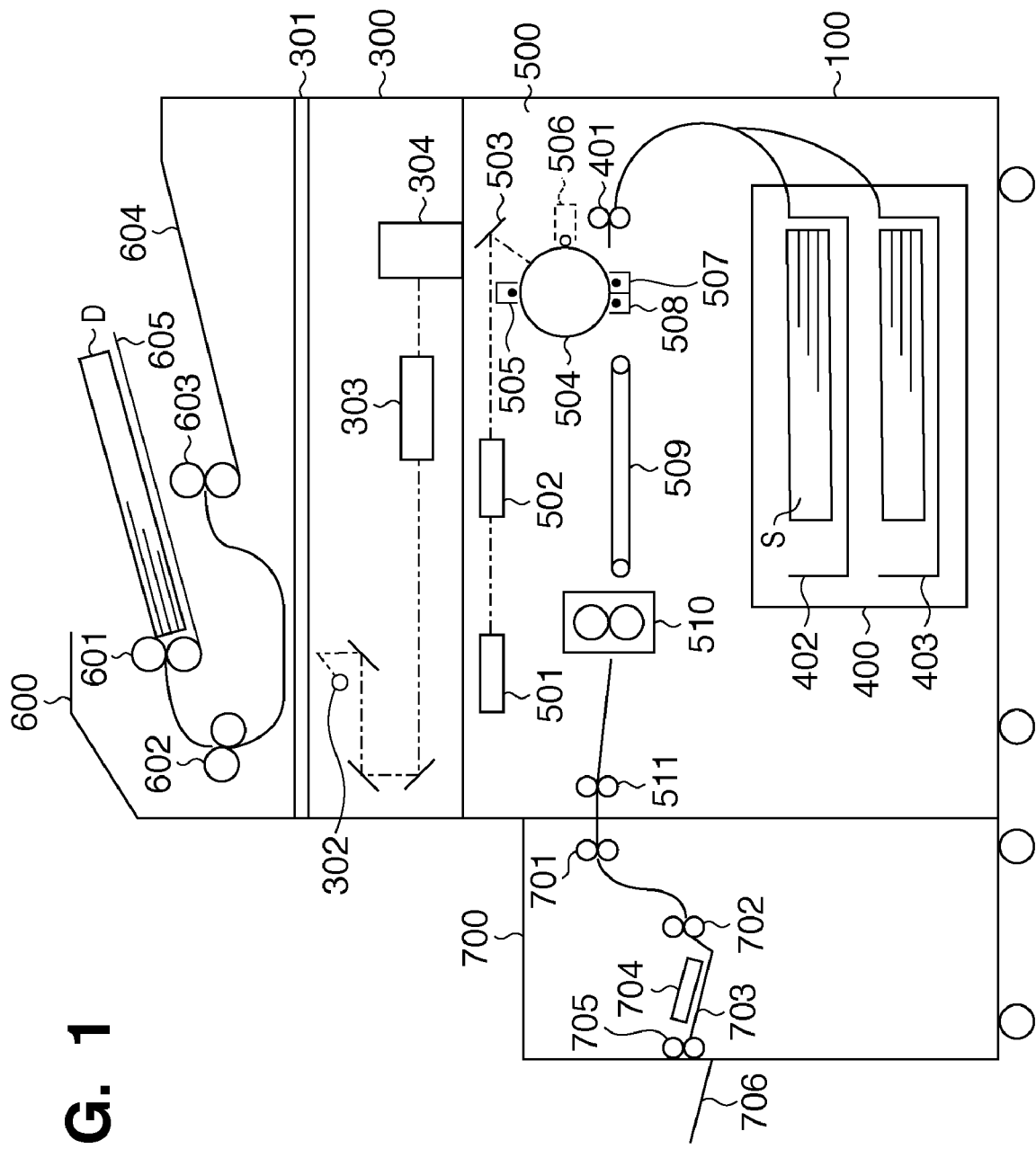
FIG. 1 represents a cross-section of an image forming apparatus.

A first embodiment of the present invention will be described below referring to the drawings. FIG. 1 shows a detailed configuration of an image forming apparatus. When a user inputs an authentication request in an authentication system of the present embodiment, the image forming apparatus functions as a terminal device and issues the request to an authentication server. The authentication server performs user authentication, and also performs user account maintenance according to a user operation. In the present embodiment, account authentication and maintenance are managed in an integrated fashion by the authentication server.

The image forming apparatus 100 is provided with an operation unit 200, a document reading unit 300, a paper feeding unit 400, an image forming unit 500, a controller 800, a document feeding unit 600, and a sheet processing unit 700. The operation unit 200, while not shown in FIG. 1, is provided on an upper portion of the document reading unit 300. The controller 800, not shown in FIG. 1, is provided inside the image forming apparatus 100.

When scan start or document copy start is instructed by the operation unit 200, the instruction is passed to the controller 800, and the controller 800 instructs the document reading unit 300 to start image reading. A document D set on a document feeding tray 605 of the document feeding unit 600 is separated one sheet at a time by separating rollers 601, and conveyed over a platen glass 301 by conveying rollers 602. The document D, having passed over the platen glass 301, is discharged into a discharge tray 604 by discharge rollers 603.

Light reflected onto the document D passing over the platen glass 301 from a light source 302 is read as image data by a CCD image sensor 304 via a lens system 303. Image data read by the CCD image sensor 304 is initially transferred to the controller 800, and saved on a hard disk (HDD) 1004 described below.

In the image forming unit 500, image data saved on the HDD 1004 (not shown) is sent to a laser output unit 501, and a laser beam based on the image data is output from the laser output unit 501. The output laser beam passes through an imaging lens system 502, and is reflected by a mirror 503 and converged onto the surface of a photoreceptor 504, where it forms an image. The photoreceptor 504 is charged in advance by a primary charger 505, with a latent image being formed as a result of light being irradiated, and the latent image then being developed by a developer 506 to form a toner image.

Sheets S fed from a tray 403 or 402 of the paper feeding unit 400 are sent to the image forming unit 500, after correcting for oblique motion with registration rollers 401, and synchronizing timing. In the image forming unit 500, the toner image on the photoreceptor 504 is transferred to the sent sheets S by a transfer charger 507. The sheets S to which the toner image has been transferred are separated from the photoreceptor 504 by a separation charger 508. The separated sheets S are conveyed to a fixing device 510 by a conveying device 509, and the toner image is permanently fixed to the sheets S by the fixing device 510 using heat and pressure. The sheets S fixed with an image are conveyed to the sheet processing unit 700 by discharge rollers 511. The sheets S conveyed to the sheet processing unit 700 are conveyed to a processing tray 703 by conveying rollers 701 and 702. The sheets S sequentially conveyed to the processing tray 703 are aligned in a stack of sheets by an alignment member 704. The aligned stack is stapled by a stable unit (not shown) as necessary, in accordance with a designation from a user. The stack is then discharged into a loading tray 706 by stack discharge rollers 705.

One copy of the document D is thereby completed, with this operation being repeated until the number of copies desired by the user is reached.

Figure 2:
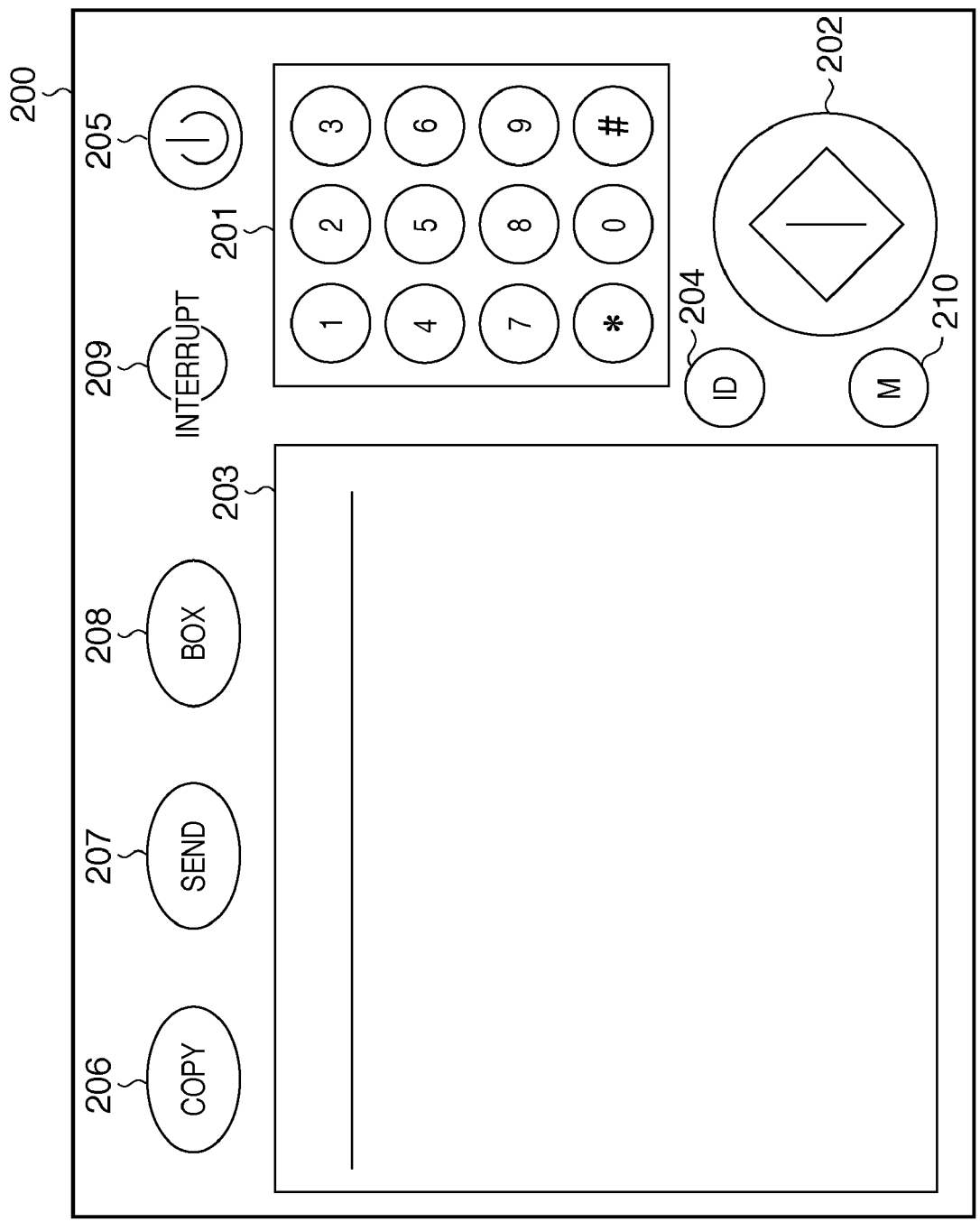
FIG. 2 represents an operation unit provided in the image forming apparatus.

Next, the configuration of the operation unit 200 is shown in FIG. 2. A numeric keypad 201 is used when inputting numeric values. A start key 202 is used when instructing the start of processing associated with scanning. A touch panel 203 consists of the combination of a liquid crystal screen and a touch sensor, and a variety of detailed settings can be made by displaying separate setting screens for each mode, and touching keys drawn on the screens. An ID key 204 is used when logging in and logging out. A power key 205 is used when powering the device off and on. A copy mode key 206 is used when selecting a copy function. A send key 207 is used when selecting an image transmission function. The image transmission function involves transferring an image read by the document reading unit 300 or a file stored in a box (described below) to another device by facsimile, email or various network protocols.

A box key 208 is used when selecting a box function. Boxes will be described later. An interrupt key 209 is used when a user wants to interrupt current processing and execute other processing. A mode setting key 210 is used when changing a basic setting of the system.

Figure 3:
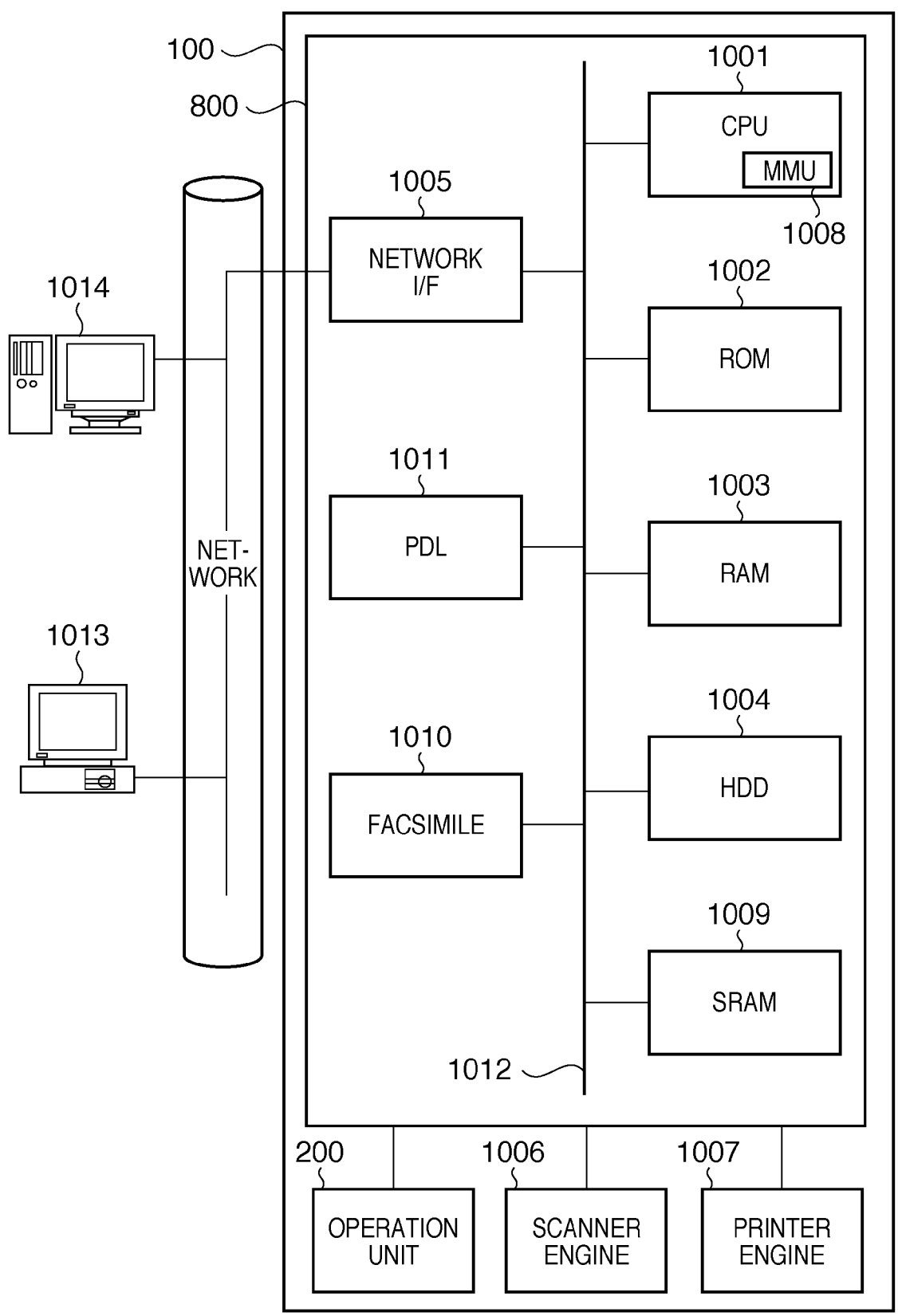
FIG. 3 is a block diagram showing the overall system and the configuration of a controller 800.

FIG. 3 is a block diagram showing the overall system and the configuration of the controller 800. In FIG. 3, a central processing unit (CPU) 1001 controls the overall image forming apparatus and performs various calculations. A read-only memory (ROM) 1002 stores a computer program for starting up the system. A random access memory (RAM) 1003 is used as an area for storing computer programs for an operating system (OS) and applications loaded from a secondary memory, as a work area and buffer for the CPU 1001, and as an image memory. The HDD 1004 is a large-volume secondary memory that stores programs for controlling the system and comparatively large image data. A network interface (net I/F) 1005 serves as an interface with a network. A scanner engine 1006 performs the actual reading of images, and is equivalent to the document reading unit 300 and the document feeding unit 600 in FIG. 1. A printer engine 1007 performs the actual printing, and is equivalent to the paper feeding unit 400, the image forming unit 500 and the sheet processing unit 700 in FIG. 1. The operation unit 200, which is provided with a touch panel, various keys and the like, displays information to the user and receives input of instructions from the user. A static random access memory (SRAM) 1009 has a dedicated power supply so as not to lose the stored data when the device is powered off. A facsimile unit 1010 decompresses compressed data received via a telephone line, and moves the decompressed data to the HDD 1004. The facsimile unit 1010 also compresses image data transferred from the HDD 1004, and transmits the compressed image data via a telephone line. A page description language(PDL) processing unit 1011 develops PDL data into image data. An internal bus 1012 connects the above constituent elements, and transmits and receives data therebetween.

A personal computer (PC) 1013 and an authentication server 1014 that performs user authentication exchange data with the controller 800 via the net I/F 1005. In the present embodiment, TCP/IP is used as the communication protocol between the PC 1013, the authentication server 1014 and the net I/F 1005. Note that in present embodiment, a plurality of image forming apparatuses similar in configuration to the image forming apparatus 100 shown in FIG. 3 are assumed to be connected to a network.

A memory management unit (MMU) 1008 is built into the CPU 1001. Physical memory is managed in blocks called pages or segments using the MMU 1008, and these blocks are allocated to logical address space. Allocating the secondary memory HDD 1004 to logical address space if there is insufficient physical memory provides an application run by the operating system with greater virtual memory space than the physical memory.

The operating system running on the CPU 1001 operates in coordination with the MMU 1008. If a program has accessed a logical address, the MMU 1008 converts the logical address to a physical address, and checks whether the converted physical address is an address in physical memory. If an address in physical memory, the MMU 1008 accesses the physical memory. If not an address in physical memory, the MMU 1008 hands control over to the operating system, which reads the required block from the HDD 1004 into physical memory, and hands control back to the MMU 1008. If there is insufficient free space in physical memory to read in the block, the operating system writes a block that is not required to the HDD 1004.

Figure 4:
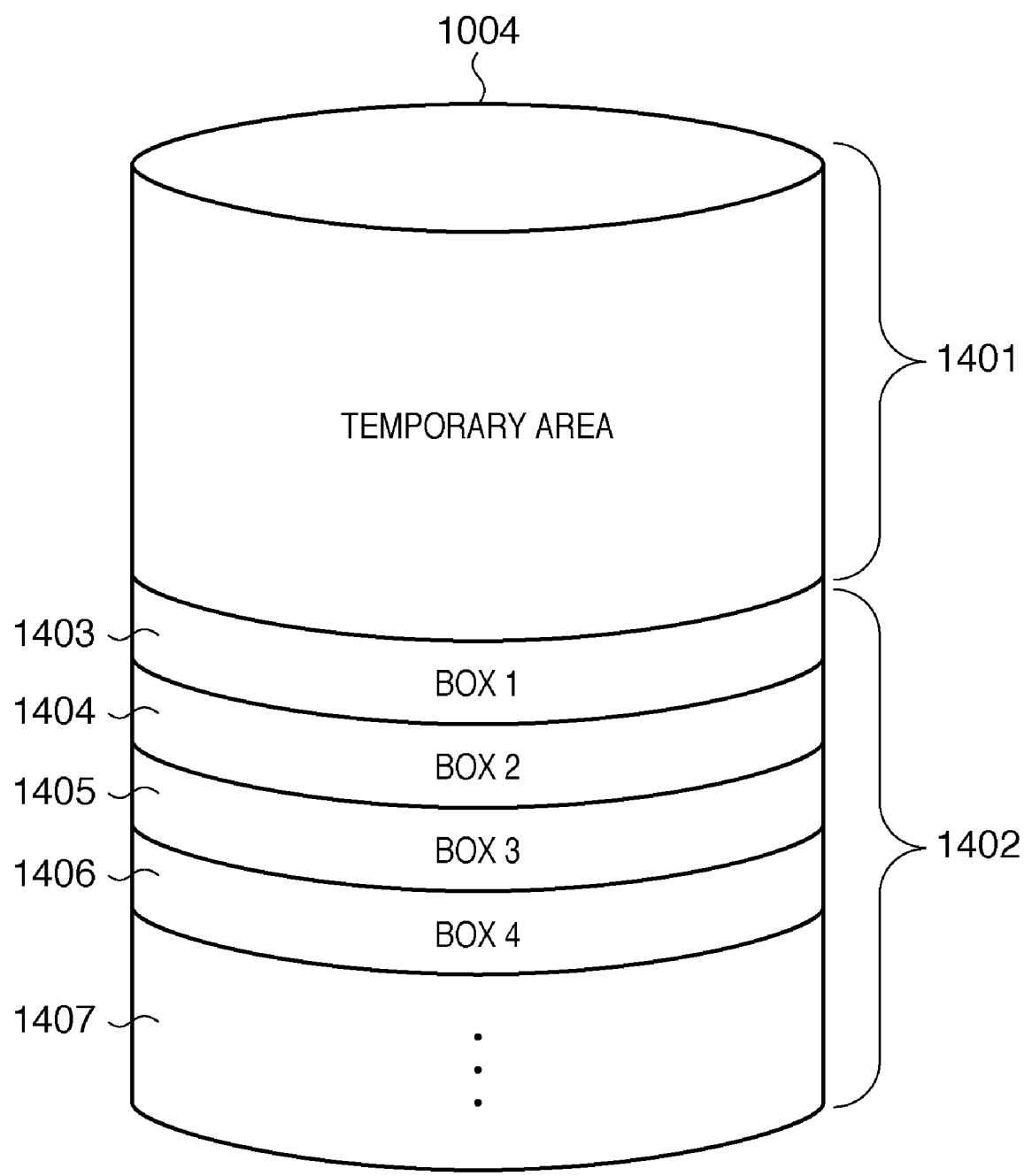
FIG. 4 represents a logical use method of an HDD 1004 in preferred embodiments.

FIG. 4 is an illustrative diagram showing a logical use method of the hard disk 1004. In the present embodiment, the storage area of the hard disk is logically divided between a temporary area 1401 and a box area 1402 according to the use application. The temporary area 1401 is a storage area that temporarily stores scanned image data and developed PDL data to enable the output order of image data to be changed or image data to be output by a single operation of scanning or developing images even when outputting plural copies. The box area 1402 is a storage area for using a box function, and is divided into a plurality of smaller storage areas (hereinafter, called boxes) 1403, 1404, 1405, 1406 and 1407 that have been registered.

In the present embodiment, the box function denotes storing image information files in which image data received from a host such as a PC is combined with a designated output configuration, and document image data read by a scanner in a designated area of the HDD 1004, and, further, designating data stored in the HDD 1004 using the operation unit 200 and printing out the designated data. The boxes 1403 to 1407 can be allocated to individual departments in a company or the like, or to individual users, and each box can be provided with a box name and a password. A user is able to access a box by designating the box name. If a password is provided, a list of the image data in the box cannot actually be acquired without inputting the password, preventing image data from being printed out. A user ID or access rights can be set as additional information to the image data stored in a box. Setting a user ID or access rights enables list acquisition and image data display/output to be restricted by a user or a group of users.

In the above configuration, the controller 800 is able to manage the HDD 1004 across a plurality of areas, and store an image in an arbitrary one of the plurality of areas designated by a user operation input or the like (storage mode). Further, the controller 800 is able to read out an image from the designated area and print the read image (output mode). The controller 800 is also able to display on the operation unit 200 that the plurality of boxes 1403 to 1407 are being searched as a result of a user operation input or the like, and to display the titles of image data in the plurality of boxes 1403 to 1407 based on a collation result of the search.

FIG. 5 represents a data structure of a user authentication table 2010 for managing the account information of users that use the image forming apparatus 100. The user authentication table 2010 in FIG. 5 is stored in an HDD (not shown) of the authentication server 1014. The user authentication table 2010 stores, for each user ID 2011, a record composed of the user ID 2011 which is unique in the system, a password 2012 thereof, and a home directory 2013 thereof that serves as a personal data area for the user. In FIG. 5, the user ID 2011 is represented by a character string, although unique numeric values that correspond to the user IDs may be held internally. The home directory is location information showing the location (directory) where a user provided with an account has saved data such as images concerning that user. The user authentication table is a table in which the account information of users provided with a user account is registered.

Figure 6:
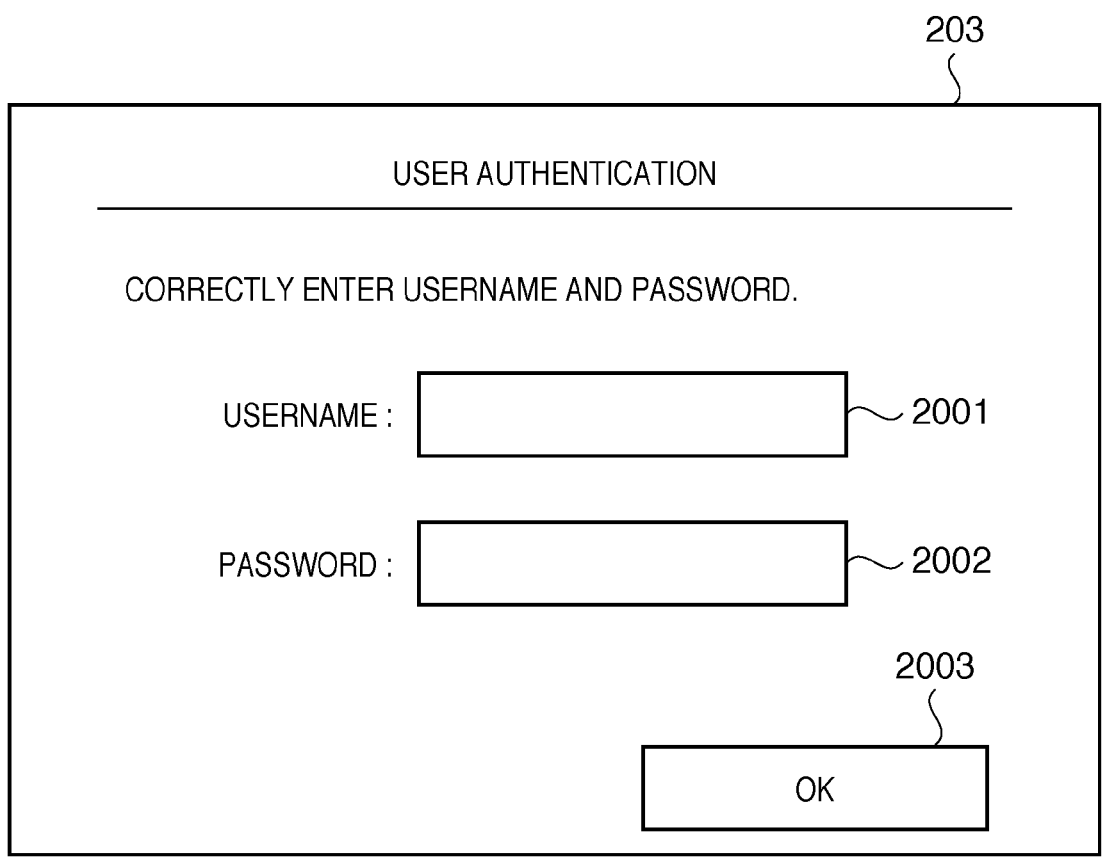
Figure 7:
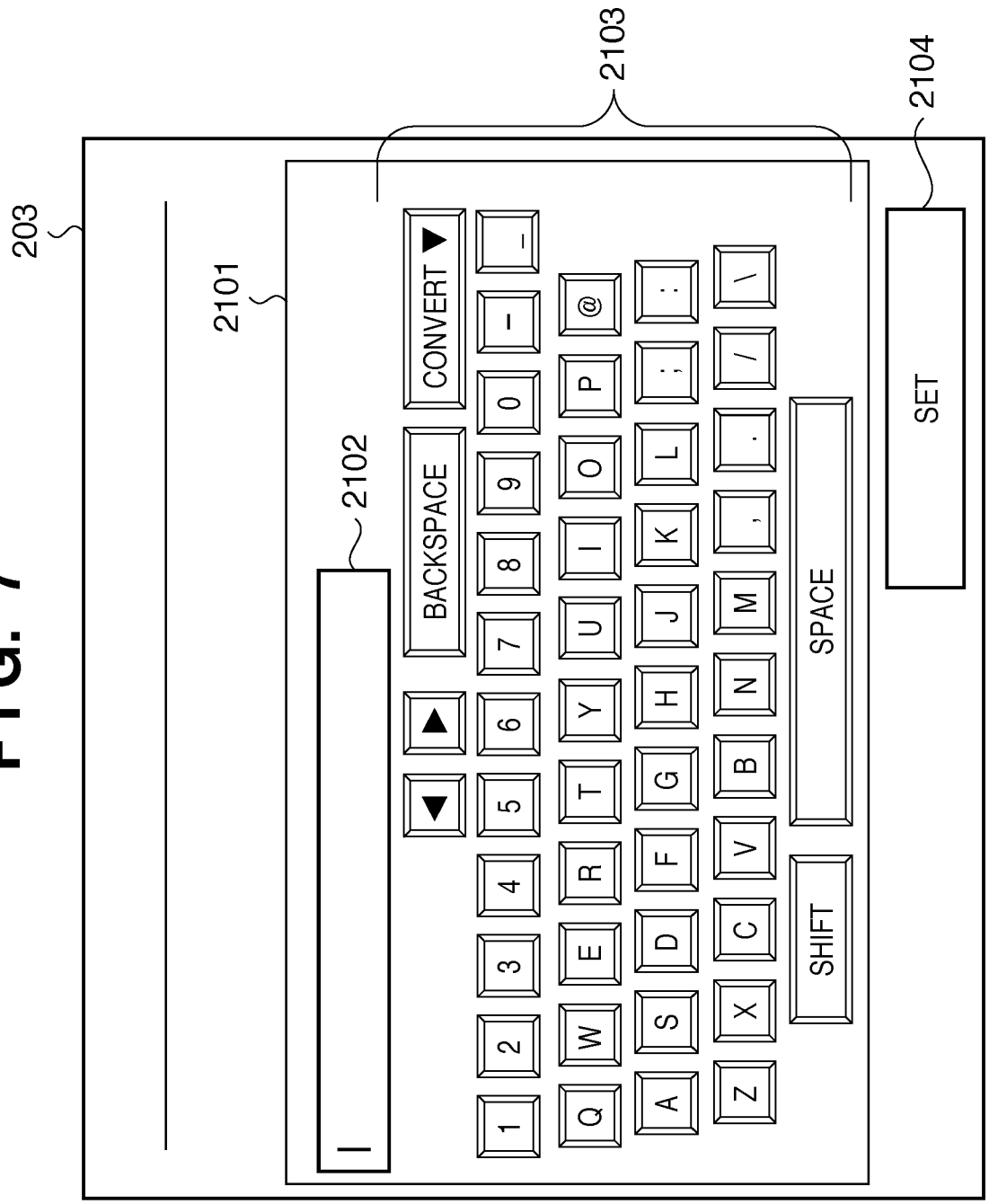
FIG. 7 represents a screen displayed on the touch panel 203 of the operation unit 200 when entering a character string.

FIG. 6 shows a screen displayed on the touch panel 203 of the operation unit 200 in the image forming apparatus 100 when logging in. In FIG. 6, a box 2001 is a user ID input field and a box 2002 is a password input field, and when either the box 2001 or the box 2002 is pressed, an input screen 2101 shown in FIG. 7 is displayed on the touch panel 203. In FIG. 7, content being input is displayed in a display area 2102 for displaying input characters. A software keyboard 2103 consists of keys enabling input of characters to be displayed in the display area 2102. When a set key 2104 is pressed, FIG. 6 is displayed on the touch panel 203, and the character string that was displayed in the display area 2102 is displayed in the user ID box 2001 or the password box 2002. When an OK key 2003 is pressed, the CPU 1001 transmits the character string in the user ID box 2001, the character string in the password box 2002, and the IP address allocated to the net I/F 1005 to the authentication server 1014 via the net I/F 1005, and requests authentication. An authentication result is received from the authentication server 1014, and if authentication succeeded, the CPU 1001 reads out a screen information file placed in the home directory 2013 corresponding to the user ID 2011, and displays a screen on the touch panel 203 based on this screen information file.

On the other hand, the authentication server 1014, having received the authentication request, performs authentication with the combination of the user ID 2011 and the password 2012 in the user authentication table 2010 stored in advance in the HDD (not shown), using the received character strings. If authentication succeeds, the authentication server 1014 adds the IP address 2021 of the authentication requester and the authenticated user ID 2022 to an authentication requesters list 2020 shown in FIG. 8 as a single record. The authentication requesters list serves as authentication history information. The IP address is the identification information of the requesting device (image forming apparatus that made the authentication request), and the user ID is the identification information of the requesting user. Further, the authentication server 1014 notifies the IP address of the authentication requester that authentication succeeded. Note that if the combination of IP address and user ID already exists, it is not added to the authentication requester list 2020. If authentication fails, the authentication server 1014 notifies the IP address of the authentication requester that authentication failed.

Figure 9:
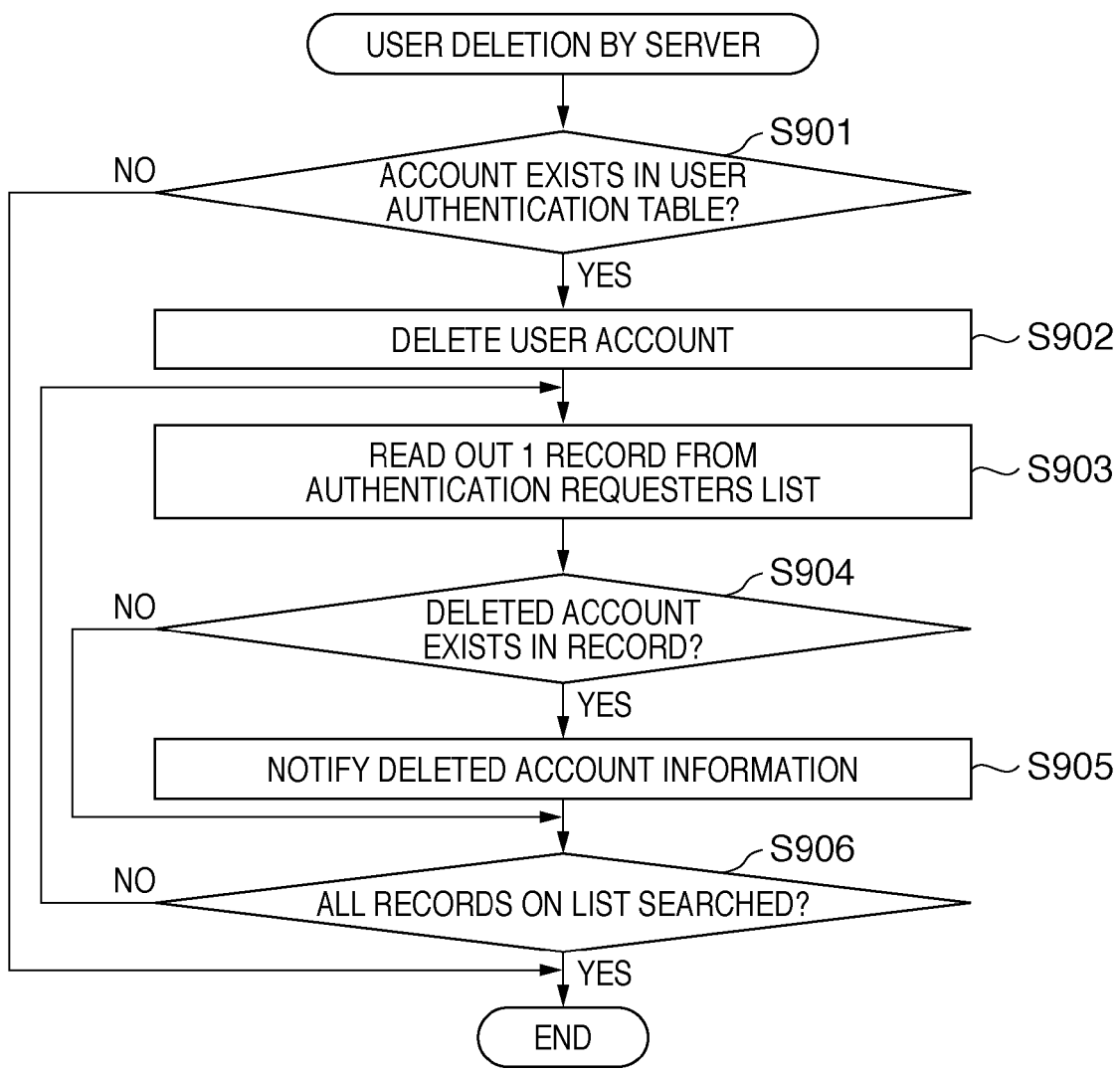
FIG. 9 is a flowchart illustrating a control processing procedure in the authentication server 1014 for when deleting a user account in a first embodiment.

FIG. 9 is a flowchart illustrating a control processing procedure in the authentication server 1014 for when deleting a user account in the present embodiment. The authentication server 1014 moves to step S901 when instructed to delete an account by an input apparatus (not shown) such as a keyboard connected by a local terminal or a terminal device connected by a network or the like.

In step S901, the authentication server 1014 judges whether a user ID matching the ID of the account instructed to be deleted exists in the user authentication table 2010, moving to step S902 if a matching user ID does exist, and ending the processing if a matching user ID does not exist.

In step S902, the authentication server 1014 reads out the record corresponding to the user ID retrieved in step S901, and, further, deletes this record from the user authentication table 2010 and moves to step S903.

In step S903, the authentication server 1014 reads out a single record from the authentication requesters list 2020, and moves to step S904.

In step S904, the authentication server 1014 judges whether a user ID matching the ID of the account instructed to be deleted exists in the record read out in step S903, moving to step S905 if a matching user ID does exist, and moving to step S906 if a matching user ID does not exist.

In step S905, the authentication server 1014 notifies deleted account information that includes the content of the record read out in step S902 to the IP address 2021 of the authentication requester of the record read out in step S903, and moves to step S906. That is, since data concerning the user is possibly saved on an image forming apparatus from which a request to authenticate the user ID targeted for deletion has previously been received, a notification to delete that user account is issued to the image forming apparatus. Deleted account information is the account information of the user targeted for deletion. Account information includes at least the user ID (i.e., identification information) registered in the authentication table, and apart from that includes the home directory of the user. The address where information concerning the user is saved, for instance, may be included instead of the home directory. As for the password, this is transmitted in the account information as necessary when deleting an account in an image forming apparatus.

In step S906, the authentication server 1014 judges whether all records in the authentication requesters list 2020 have been searched, moving to step S903 if searching has not ended, and ending the processing if searching has ended.

Figure 10:
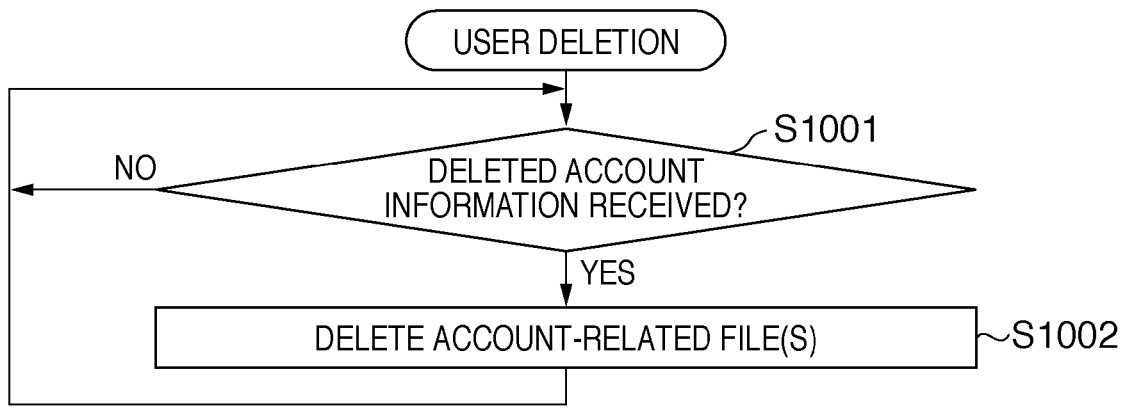
FIG. 10 is a flowchart illustrating a control processing procedure in the controller 800 for when deleting a user account.

FIG. 10 is a flowchart illustrating a control processing procedure in the controller 800 of the image forming apparatus 100 for when deleting a user account in the present embodiment.

In step S1001, the CPU 1001, on receipt of deleted account information transmitted from the authentication server in step S905 via the net I/F 1005, moves to step S1002. In step S1002, the CPU 1001 deletes files and/or directories under the home directory 2013 included in the received deleted account information. Further, the CPU 1001 deletes all image data stored in the box area 1402 for which the user ID set as additional information to the image data matches the user ID included in the received deleted account information, and moves to step S1001.

In the present embodiment, the authentication server 1014 adds a record consisting of the IP address of the authentication requester and the authenticated user ID to the authentication requesters list 2020 when authentication is requested, although a record consisting of only the IP address may be added. If only the IP address is added, the authentication server 1014 transmits an instruction to delete the account to all IP addresses on the authentication requesters list 2020 irrespective of the user ID targeted for deletion when deleting a user account.

In the present embodiment, the case was described where files and directories under the home directory of a deleted user and image data belonging to the deleted user are deleted. However, files in a directory other than those belonging to the user and directories other than the home directory may, of course, be deleted.

According to the present embodiment, the above configuration results in a terminal (i.e., image forming apparatus) to which a user logs in and requests user authentication being stored in an authentication server. This enables an instruction to delete information (e.g., files, image data, etc.) concerning the user targeted for deletion that is saved on a terminal to be automatically issued to a terminal used by the user, when deleting a user account. Information concerning a user targeted for deletion can thus be deleted efficiently, and concerns about omission in the deletion of information can be reduced. Moreover, deletion can be performed efficiently because the account deletion request is only sent to image forming apparatuses that have previously requested authentication.

Figure 11:
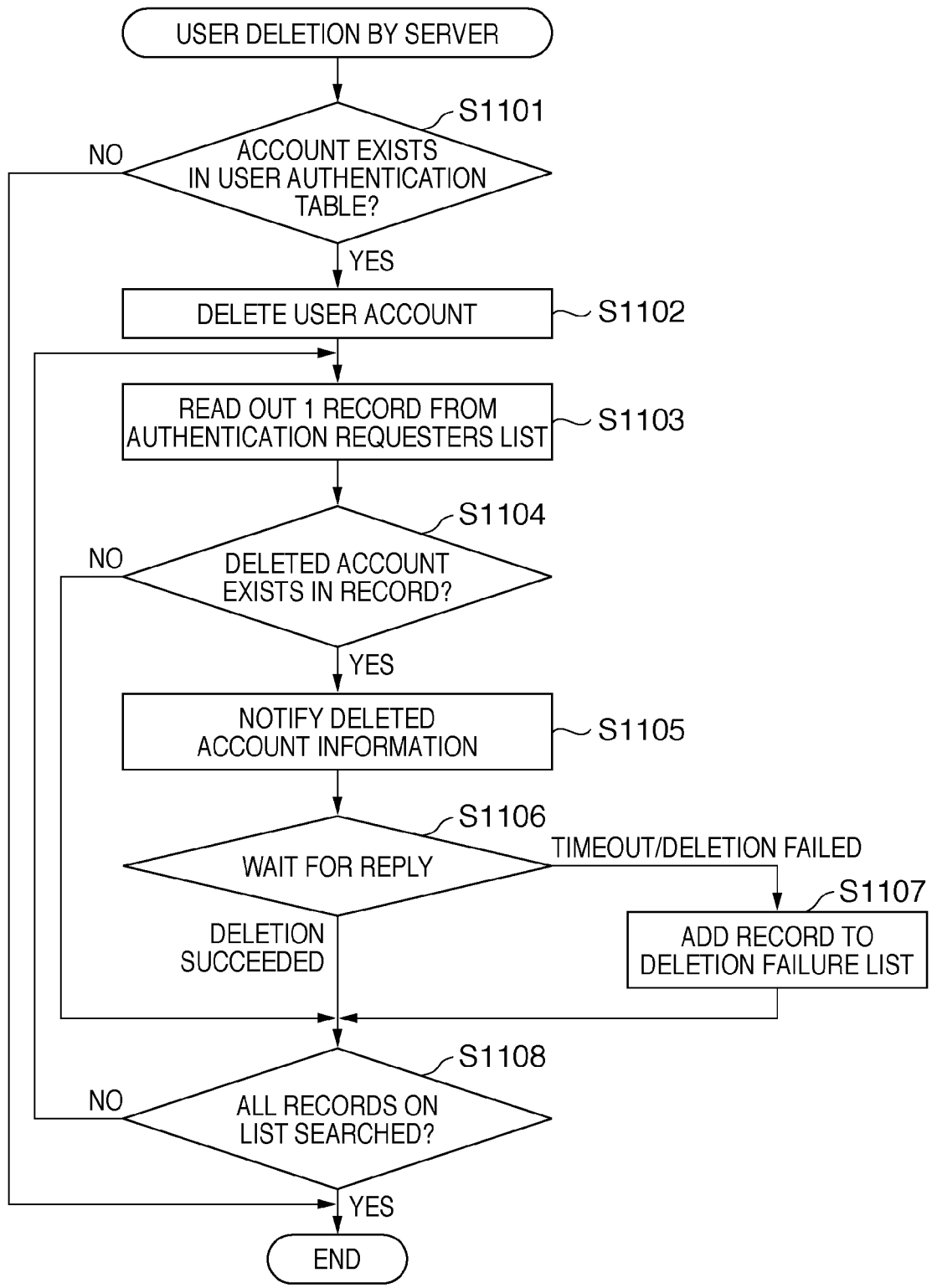
FIG. 11 is a flowchart illustrating a control processing procedure in the authentication server 1014 for when deleting a user account in a second embodiment.

A second embodiment of the present invention will be described below referring to the drawings. In the above first embodiment, a method premised on the successful deletion of account-related files of a deleted account in an image processing apparatus such as an image forming apparatus was illustrated. However, if power to an image forming apparatus is cut or a network cable is temporarily disconnected when an account is being deleted, the deletion instruction may be irretrievable, giving rise to the possibility of there being apparatuses in which account-related files have not been deleted. In view of this, in the present embodiment, an example is presented that also takes into account failure to delete account-related files. FIG. 11 is a flowchart illustrating a control processing procedure in the authentication server 1014 for when deleting a user account in the present embodiment.

The authentication server 1014 moves to step S1101 when instructed to delete an account by an input apparatus (not shown) such as a keyboard connected by a local terminal or a terminal device connected by a network or the like.

In step S1101, the authentication server 1014 judges whether a user ID matching the ID of the account instructed to be deleted exists in the user authentication table 2010, moving to step S1102 if a matching user ID does exist, and ending the processing if a matching user ID does not exist.

In step S1102, the authentication server 1014 reads out a record corresponding to the user ID retrieved in step S1101, and, further, deletes this record from the user authentication table 2010, and moves to step S1103.

In step S1103, the authentication server reads out a single record from the authentication requesters list 2020, and moves to step S1104.

In step S1104, the authentication server judges whether a user ID matching the ID of the account instructed to be deleted exists in the record read out in step S1103, moving to step S1105 if a matching user ID does exist, and moving to step S1108 if a matching user ID does not exist.

In step S1105, the authentication server 1014 notifies deleted account information that includes the content of the record read out in step S1102 to the IP address 2021 of the authentication requester of the record read out in step S1103, and moves to step S1106.

In step S1106, the authentication server 1014 waits for a reply from the image forming apparatus 100. The authentication server 1014 moves to step S1108 if a reply indicating deletion succeeded is received, and moves to step S1107 if a reply (or response) indicating deletion failed is received or if a reply is not returned within a fixed period.

Figures 12, 13:
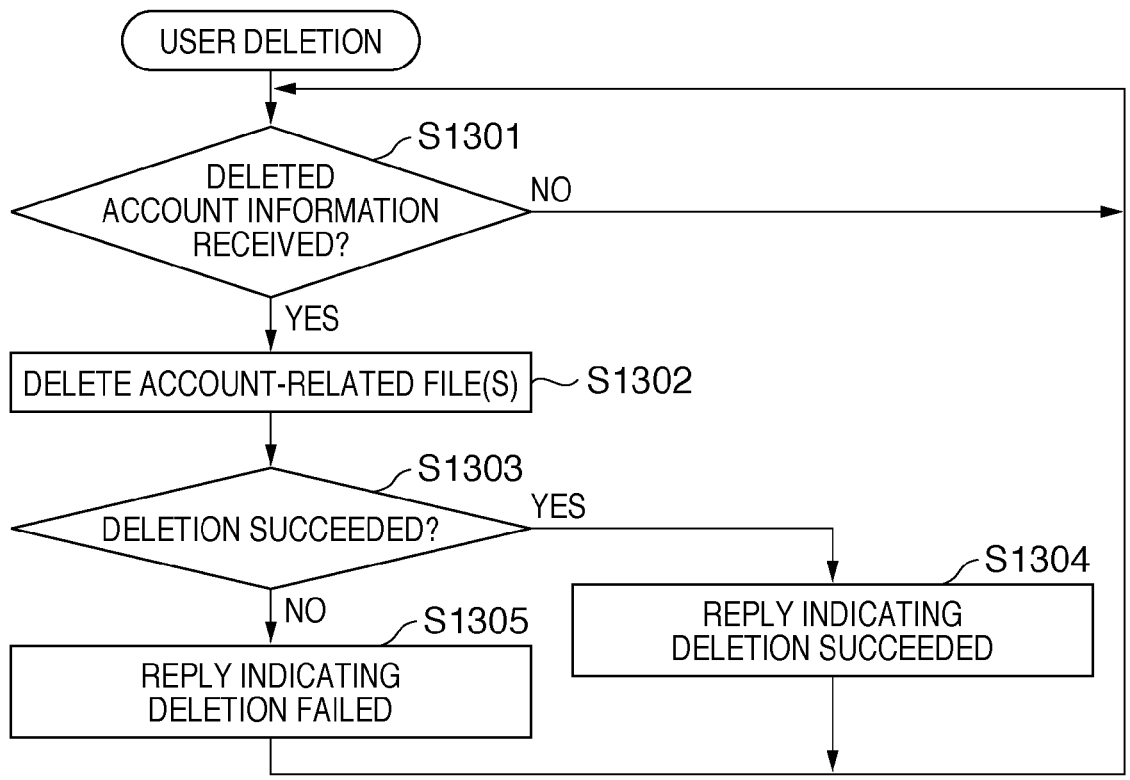
FIG. 12 represents a data structure held on an HDD of the authentication server 1014 in order to manage information with respect to which account deletion failed.
FIG. 13 is a flowchart illustrating a control processing procedure in the controller 800 for when deleting a user account in the second embodiment.

In step S1107, the authentication server adds a single record to a deletion failure list 2030 shown in FIG. 12, and moves to step S1108. This record includes an IP address 2031 of the authentication requester with respect to which account deletion failed, a user ID (account targeted for deletion) 2032, and a home directory 2033.

In step S1108, the authentication server 1014 judges whether all records in the authentication requesters list 2020 have been searched, moving to step S1103 if searching has not ended, and ending the processing if searching has ended.

FIG. 13 is a flowchart illustrating a control processing procedure in the controller 800 for when deleting a user account in the present embodiment.

In step S1301, the CPU 1001, on receipt of deleted account information from the authentication server via the net I/F 1005, moves to step S1302.

In step S1302, the CPU 1001 deletes files and/or directories under the home directory 2013 included in the received deleted account information. Further, the CPU 1001 deletes all image data stored in the box area 1402 for which the user ID set as additional information to the image data matches the user ID included in the received deleted account information, and moves to step S1303.

In step S1303, the CPU 1001 judges whether the deletion succeeded in step S1302, moving to step S1304 if deletion succeeded, and moving to step S1305 if deletion failed. Here, success includes the case where there is no longer a home directory or any image data of the corresponding account.

In step S1304, the CPU 1001 replies to the authentication server 1014 indicating that deletion succeeded, and moves to step S1301. This reply includes the deleted account information received in step S1301 and the IP address allocated to the net I/F 1005.

In step S1305, the CPU 1001 replies to the authentication server 1014 indicating that deletion failed, and moves to step S1301. This reply also includes the deleted account information received in step S1301 and the IP address allocated to the net I/F 1005.

Figure 14:
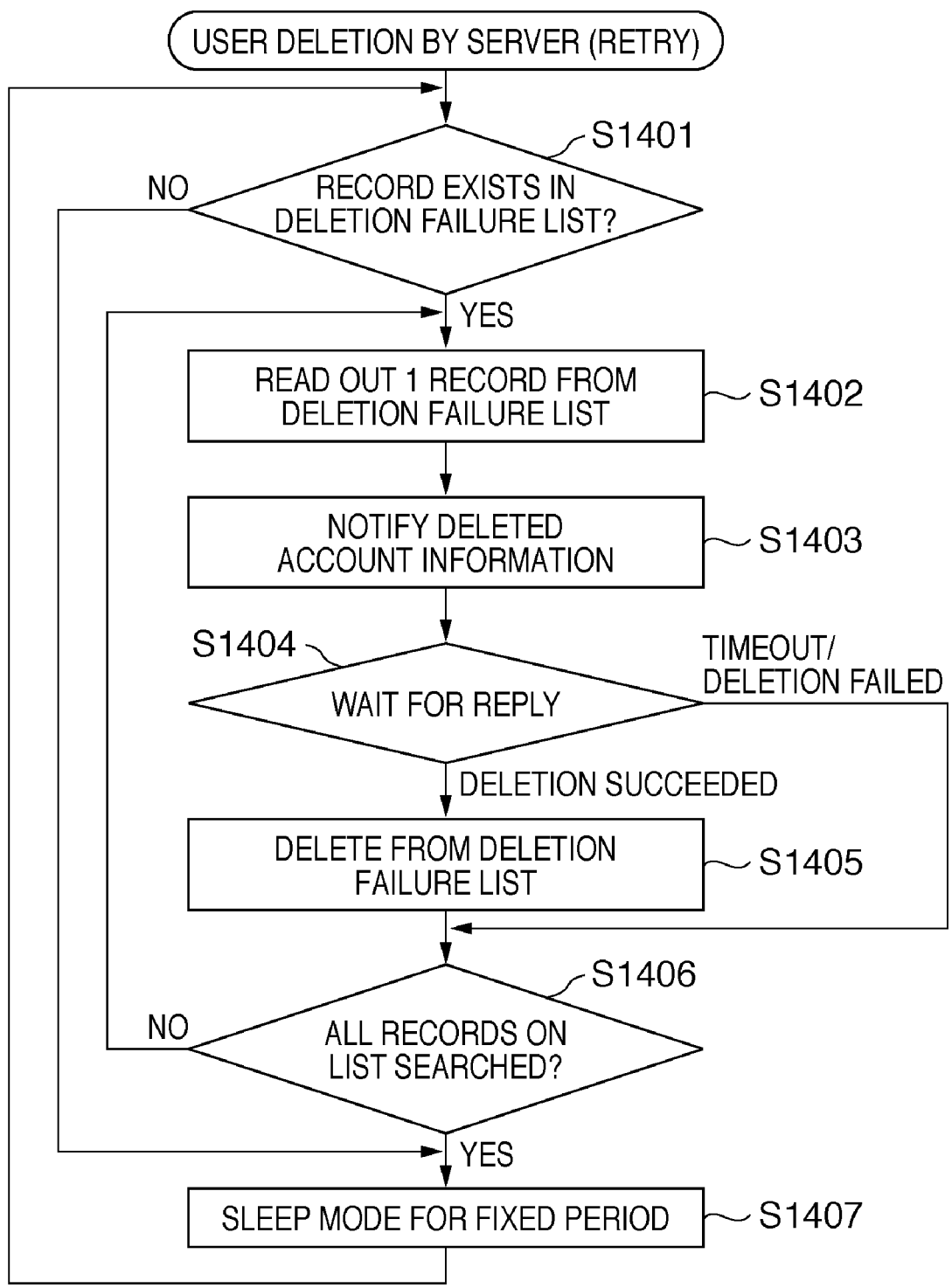
FIG. 14 is a flowchart illustrating a control processing procedure in the authentication server 1014 for when again requesting deletion of an account with respect to which deletion failed in the second embodiment.

FIG. 14 is a flowchart illustrating a control processing procedure in the authentication server 1014 for when again requesting deletion of an account with respect to which deletion failed in the present embodiment. Execution of this procedure desirably is triggered by an event that is executed either periodically or within a fixed period.

The authentication server 1014 moves to step S1401 when started up. In step S1401, the authentication server 1014 judges whether a record exists in the deletion failure list 2030, moving to step S1402 if a record does exist, and moving to step S1407 if a record does not exist.

In step S1402, the authentication server 1014 reads out a single record from the deletion failure list 2030, and moves to step S1403.

In step S1403, the authentication server 1014 notifies deleted account information that includes the home directory 2033 and the user ID 2032 to the IP address 2031 of the record read in step S1402, that is, issues a re-deletion request for again trying to delete information, and moves to step S1404.

In step S1404, the authentication server 1014 waits for a reply from the image forming apparatus 100. The authentication server 1014 moves to step S1405 if a reply indicating deletion succeeded is received, and moves to step S1406 if a reply indicating deletion failed is received or if a reply is not returned within a fixed period.

In step S1405, the authentication server 1014 deletes the record (i.e., record with respect to which the account was successfully deleted) read in step S1402 from the deletion failure list 2030, and moves to step S1406.

In step S1406, the authentication server 1014 judges whether all records in the deletion failure list 2030 have been searched, moving to step S1402 if searching has not ended, and moving to step S1407 if searching has ended.

In step S1407, the authentication server 1014 moves to step S1401 after reverting to sleep mode for a fixed period.

According to the present embodiment, the above configuration results in a terminal (i.e., image forming apparatus issued with a deletion request) that was unable to delete an account for some reason when account deletion was instructed being stored. Thus, even if it cannot be confirmed that information concerning a user has been deleted in an image forming apparatus, deletion can be subsequently retried until deletion can be confirmed, enabling the deletion process to be more reliably performed. Also, because the deletion process is automatically performed again, efficiency is further improved. Moreover, concerns about omission in the deletion of information can be further reduced.

A third embodiment of the present invention will be described below referring to the drawings. In the above second embodiment, a method was illustrated in which the deletion process was retried by the authentication server 1014 after a fixed interval, in the case where deletion of account-related files failed. In the present embodiment, a method of retrying the deletion process again when an authentication request is received will be presented.

Figure 15:
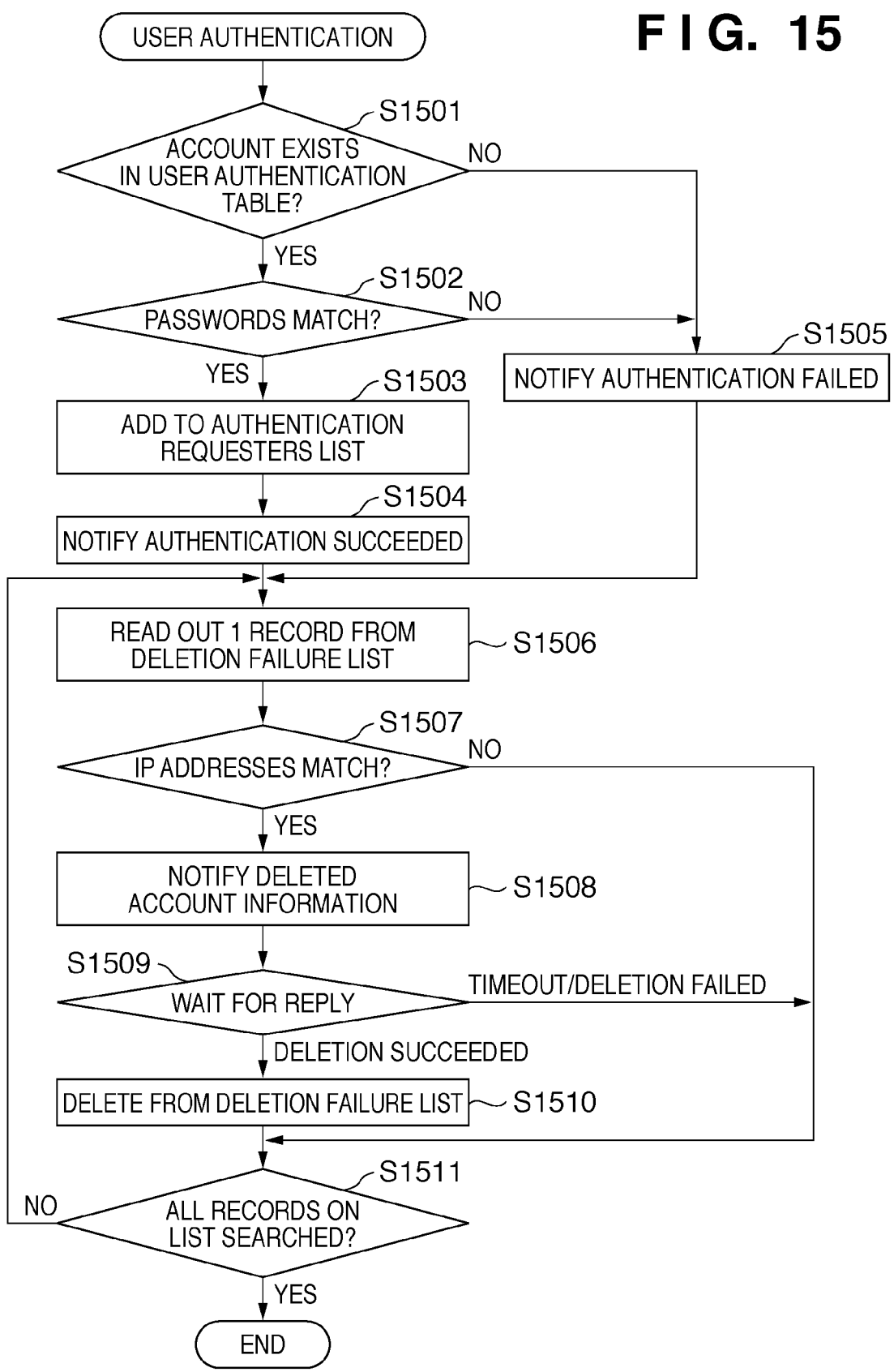
FIG. 15 is a flowchart illustrating a control processing procedure in the authentication server 1014 for when again requesting deletion of an account with respect to which deletion failed in a third embodiment.

FIG. 15 is a flowchart illustrating a control processing procedure in the authentication server 1014 for when again deleting an account with respect to which deletion failed in the present embodiment. The authentication server 1014 moves to step S1501 when requested by an image forming apparatus 100 to perform authentication.

In step S1501, the authentication server 1014 judges whether the character string of the received user ID exists in the user ID 2011 in the user authentication table 2010, moving to step S1502 if the character string of the received user ID does exist, and moving to step S1505 if the character string of the received user ID does not exist.

In step S1502, the authentication server 1014 judges whether the character string of the received password matches the password 2012 of the same record as the user ID 2011 retrieved in step S1501, moving to step S1503 if the character string of the received password does exist, and moving to step S1505 if the character string of the received password does not exist.

In step S1503, the authentication server 1014 adds the IP address 2021 of the authentication requester and the authenticated user ID 2022 to the authentication requesters list 2020 as a single record, and moves to step S1504. Note that the IP address and the user ID are not added if a record consisting of the same combination already exists.

In step S1504, the authentication server 1014 notifies the IP address of the authentication requester that authentication succeeded, and moves to step S1506.

In step S1505, the authentication server 1014 notifies the IP address of the authentication requester that authentication failed, and moves to step S1506.

In step S1506, the authentication server 1014 reads out a single record from the deletion failure list 2030, and moves to step S1507.

In step S1507, the authentication server 1014 judges whether the IP address in the record read in step S1506 matches the IP address of the device that requested authentication in steps S1501 to S1505, moving to step S1508 if matched, and moving to step S1511 if not matched.

In step S1508, the authentication server 1014 notifies deleted account information that includes the home directory 2033 and the user ID 2032 to the IP address 2031 read in step S1506, and moves to step S1509.

In step S1509, the authentication server 1014 waits for a reply from the image forming apparatus 100. The authentication server 1014 moves to step S1510 if a reply indicating deletion succeeded is received, and moves to step S1511 if a reply indicating deletion failed is received or if a reply is not returned within a fixed period.

In step S1510, the authentication server 1014 deletes the record read in step S1506 from the deletion failure list 2030, and moves to step S1511.

In step S1511, the authentication server 1014 judges whether all records in the deletion failure list 2030 have been searched, moving to step S1506 if searching has not ended, and ending the processing if searching has ended.

The above procedure results in a device that requested authentication being requested to delete information concerning a user targeted for deletion in the case where deletion of information in that apparatus could not be confirmed. A request to delete information can thus be issued to a device that is currently operating and whose connection to the authentication server can be confirmed, enabling the deletion process to be reliably retried on a device with respect to which deletion of information has not been confirmed due, for instance, to deletion failure resulting from the device going offline or not being powered on, or to the deletion confirmation having not reached the authentication server.

A fourth embodiment of the present invention will be described below referring to the drawings. The first to third embodiments illustrated the case where an account is deleted, whereas the present embodiment illustrates the case where an account is changed.

Figure 16:
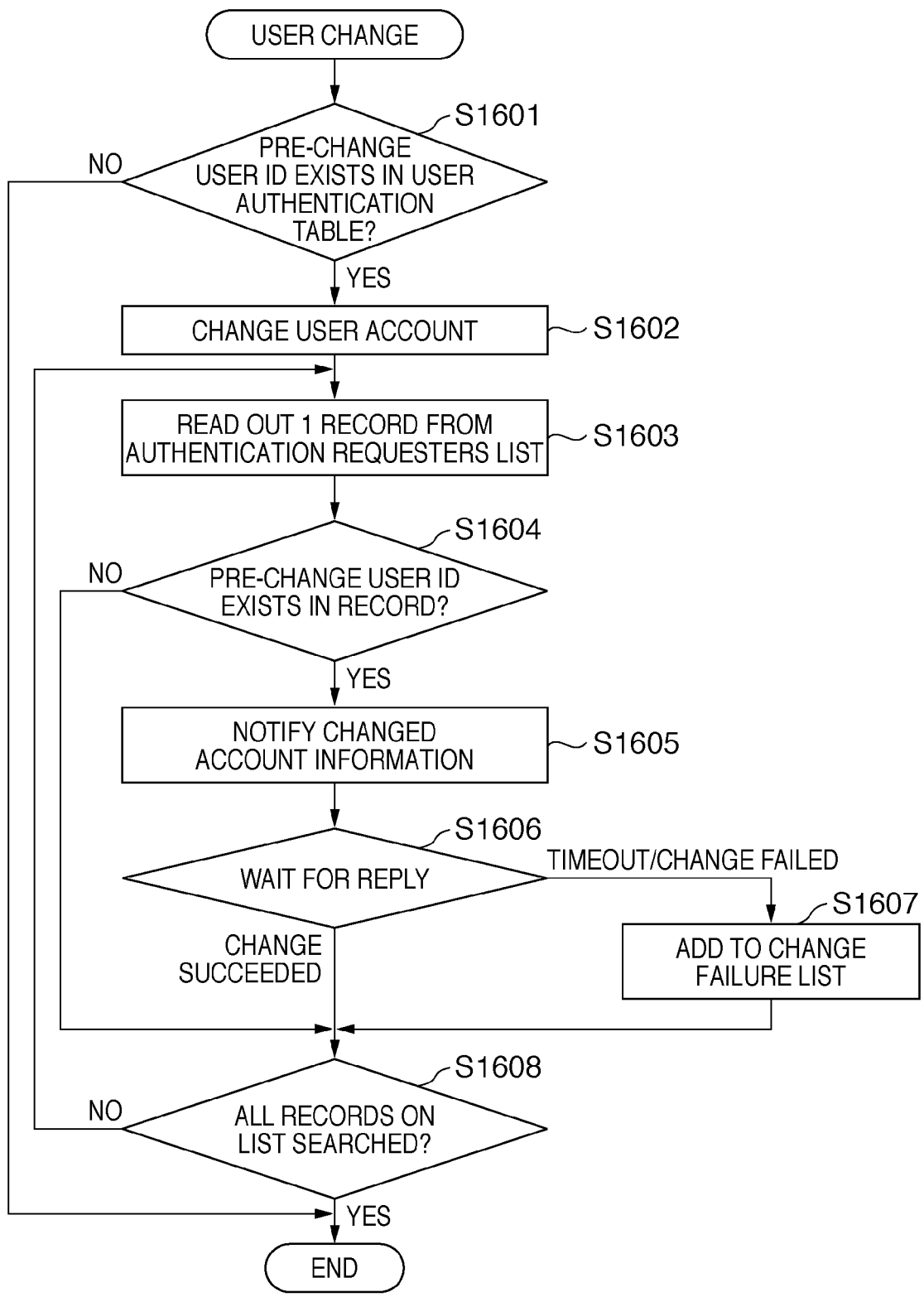
FIG. 16 is a flowchart illustrating a control processing procedure in the authentication server 1014 for when changing a user account in a fourth embodiment.

FIG. 16 is a flowchart illustrating a control processing procedure in the authentication server 1014 for when changing a user account in the present embodiment.

The authentication server 1014 moves to step S1601 on receipt of an instruction to change an account from an input apparatus (not shown) such as a keyboard connected by a local terminal or a terminal device connected by a network or the like. The account change instruction includes the user ID, password and home directory of the pre-change account and the post-change account.

In step S1601, the authentication server 1014 judges whether a user ID matching the ID of the pre-change account instructed to be changed exists in the user authentication table 2010, moving to step S1602 if a matching user ID does exist, and ending the processing if a matching user ID does not exist.

In step S1602, the authentication server 1014 changes the record in the user authentication table 2010 corresponding to the user ID retrieved in step S1601 to the instructed user ID, password and home directory of the post-change account. Further, the authentication server 1014 reads out the record composed of the pre-change user ID, password and home directory, and moves to step S1603.

In step S1603, the authentication server 1014 reads out a single record from the authentication requesters list 2020, and moves to step S1604.

In step S1604, the authentication server 1014 judges whether a user ID matching the ID of the pre-change account instructed to be changed exists in the record read out in step S1603, moving to step S1605 if a matching user ID does exist, and moving to step S1608 if a matching user ID does not exist.

In step S1605, the authentication server 1014 notifies changed account information that includes the content of the pre-change record and the content of the post-change record read out in step S1602 to the IP address of the authentication requester of the record read out in step S1603, that is, issues a change request, and moves to step S1606.

In step S1606, the authentication server 1014 waits for a reply from the image forming apparatus 100. The authentication server 1014 moves to step S1608 if a reply indicating change succeeded is received, and moves to step S1607 if a reply indicating change failed is received or if a reply is not returned within a fixed period.

In step S1607, the authentication server 1014 adds a single record to a change failure list 2040 shown in FIG. 17, and moves to step S1608. This record includes an IP address 2041 of the authentication requester with respect to which account change failed, a pre-change user ID 2042, a pre-change home directory 2043 of the user, a post-change user ID 2044, and a post-change home directory 2045 of the user.

In step S1608, the authentication server 1014 judges whether all records in the authentication requesters list 2020 have been searched, moving to step S1603 if searching has not ended, and ending the processing if searching has ended.

Figure 18:
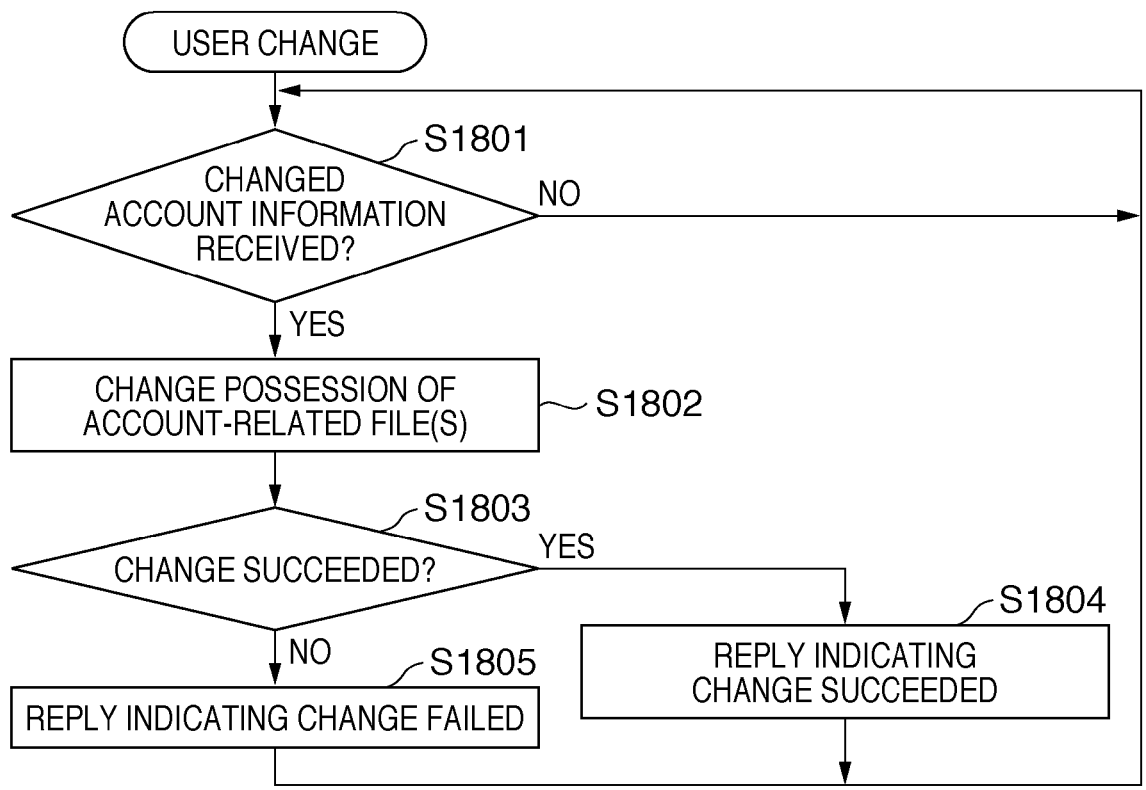
FIG. 18 is a flowchart illustrating a control processing procedure in the controller 800 for when changing a user account in the fourth embodiment.

FIG. 18 is a flowchart illustrating a control processing procedure in the controller 800 for when changing a user account in the present embodiment.

In step S1801, the CPU 1001, on receipt of changed account information via the net I/F 1005, moves to step S1802.

In step S1802, the CPU 1001 moves files and/or directories under the pre-change home directory 2043 included in the received changed account information to the post-change home directory 2045, and changes possession to the post-change user ID 2044. Further, the CPU 1001 changes possession of all image data stored in the box area 1402 for which the user ID set as additional information to the image data matches the pre-change user ID included in the received changed account information to the post-change user ID, and moves to step S1803.

In step S1803, the CPU 1001 judges whether change succeeded in step 1802, moving to step S1804 if change succeeded, and moving to step S1805 if change failed. Here, success includes the case where there is no longer a home directory or any image data of the corresponding account.

In step S1804, the CPU 1001 replies to the authentication server 1014 indicating that change succeeded, and moves to step S1801. This reply includes the changed account information received in step S1801 and the IP address allocated to the net I/F 1005.

In step S1805, the CPU 1001 replies to the authentication server 1014 indicating that change failed, and moves to step S1801. This reply also includes the changed account information received in step S1801 and the IP address allocated to the net I/F 1005.

Figure 19:
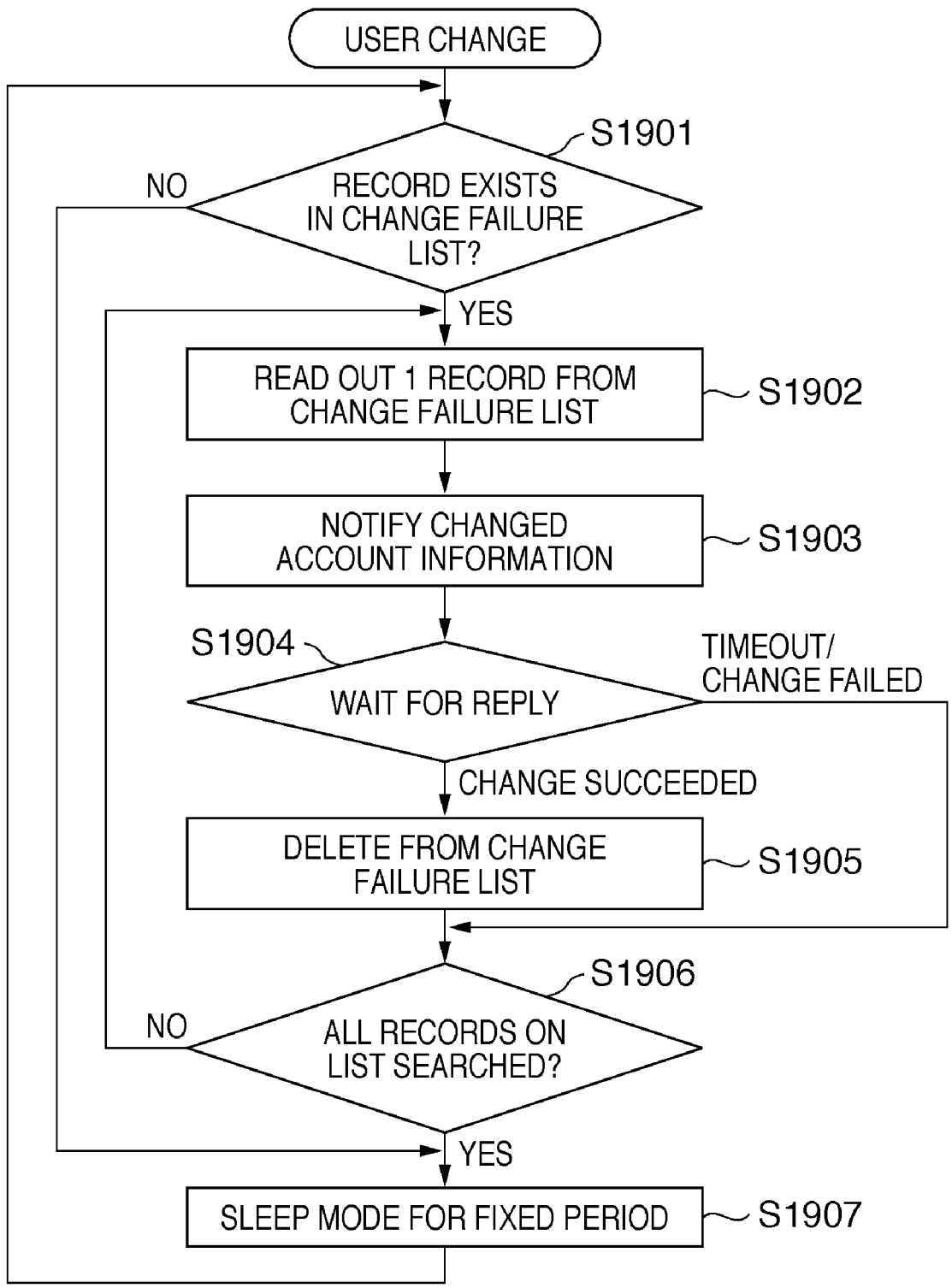
FIG. 19 is a flowchart illustrating a control processing procedure in the authentication server 1014 for when again requesting change of an account with respect to which change failed in the fourth embodiment.

FIG. 19 is a flowchart illustrating a control processing procedure in the authentication server 1014 for when again changing an account with respect to which change failed in the present embodiment. The authentication server 1014 moves to step S1901 when started up.

In step S1901, the authentication server 1014 judges whether a record exists in the change failure list 2040, moving to step S1902 if a record does exist, and moving to step S1907 if a record does not exist.

In step S1902, the authentication server 1014 reads out a single record from the change failure list 2040, and moves to step S1903.

In step S1903, the authentication server 1014 notifies changed account information to the IP address 2041 read in step S1902, that is, again issues a request for changing information (rechange request), and moves to step S1904. Note that this changed account information includes the pre-change user ID 2042, the pre-change home directory 2043 of the user, the post-change user ID 2044, and the post-change home directory 2045 of the user.

In step S1904, the authentication server 1014 waits for a reply from the image forming apparatus 100. The authentication server 1014 moves to step S1905 if a reply indicating change succeeded is received, and moves to step S1906 if a reply indicating change failed is received or if a reply is not returned within a fixed period.

In step S1905, the authentication server 1014 deletes the record read from the change failure list 2040 in step S1902, and moves to step S1906.

In step S1906, the authentication server 1014 judges whether all records in the change failure list 2040 have been searched, moving to step S1902 if searching has not ended, and moving to step S1907 if searching has ended.

In step S1907, the authentication server 1014 moves to step S1901 after reverting to sleep mode for a fixed period.

According to the present embodiment, the above configuration results in a terminal (i.e., image forming apparatus) to which a user logs in and requests user authentication being stored. This enables information such as files or image data, for example, concerning a user targeted for change that is highly likely to be stored on the terminal to be changed, when changing a user account. Thus, information concerning a user targeted for change can be efficiently changed, and concerns about omission in the changing of information can be reduced.

While the embodiments have been detailed above, a record may conceivably remain on the deletion failure list 2030 or the change failure list 2040 indefinitely. In this case, the authentication server 1014 may display the deletion failure list 2030 or the change failure list 2040 on a terminal device, or send the deletion failure list or the change failure list to an image forming apparatus that requests printing after converting the respective list to a format that the image forming apparatus can output, and have the respective list printed. The administrator is thereby able to check the record that remains on the deletion failure list 2030 or the change failure list 2040, and delete or change account-related files in the image forming apparatus directly. The record in the deletion failure list 2030 or the change failure list 2040 may then be deleted.

While IP addresses were used as the identification information of requesting devices (image forming apparatuses that requested authentication) in the foregoing embodiments, the present invention is not limited to this, provided that requesting devices can be uniquely specified. MAC addresses may be used, for example.

Note that the present invention can take an embodiment as a system, apparatus, method, computer program or storage medium, for example. Specifically, the present invention may be applied to a system constituted by a plurality of devices or to a device composed of a single device.

The present invention can be achieved supplying a software program that realizes the functions of the foregoing embodiments to a system or a device, and reading out and executing the supplied program code with a computer of the system or apparatus. Here, software denotes computer programs corresponding to the flowcharts shown in the drawings in the foregoing embodiments.

Accordingly, the present invention is also realized by the actual program code installed on the computer, in order to realize the functions and processes of the present invention by computer. In other words, the present invention also encompasses the actual computer program for realizing the functions and processes of the present invention.

In this case, the present invention may be object code, a program executed by an interpreter, script data supplied to an operating system or the like, as long as the functions of the program are provided.

Recording media for supplying the computer program include, for example, flexible disk, hard disk, optical disk, magneto-optical disk, magnetic tape, and nonvolatile memory card. Magneto-optical disks include an MO, and optical disks include CD-ROM, CD-R, CD-RW, ROM and DVD (DVD-ROM, DVD-R).

Otherwise, the computer program can be supplied by connecting a client computer to a server on the Internet, and downloading the program or a compressed file including an auto-install function from the server to a storage medium such as a hard disk. Further, supply can be realized by dividing the program code into a plurality of files and downloading the respective files from different websites. In other words, a World Wide Web (WWW) server that allows a plurality of users to download program files for realizing the functions and processes of the present invention by computer is also encompassed by the present invention.

The program can also be distributed to users in encrypted form stored on a storage medium, and users that meet a prescribed requirement can be allowed to download decryption key information, and to execute the program encrypted using this key information and install the program on a computer.

The functions of the foregoing embodiments can be realized as a result of an operating system or the like running on a computer performing part or all of the actual processing based on instructions in the program read out by computer.

Further, the functions of the foregoing embodiments are also realized by processing performed as a result of a program read out from a storage medium being written to a memory provided in a function expansion unit connected to a computer, and a CPU or the like provided in the function expansion unit executing the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-026901, filed Feb. 6, 2008, which is hereby incorporated by reference herein in its entirety.

What is claimed is:

1. An authentication server that performs user account maintenance and user authentication, the authentication server comprising:
a storage unit configured to store a user authentication table in which user account information is registered;
a processor; and
a memory configured to store at least one program executable by the processor, the at least one program comprising program code that, when executed by the processor, implements:
a save unit configured to, in response to a request for user authentication, save information of a device that requests the user authentication in an authentication requesters list in association with account information of a user that requested the user authentication; and
a deletion unit configured to, in response to a user account information deletion request, delete account information of a user targeted for deletion from the user authentication table and issue a deletion request to delete information related to the user targeted for deletion to a device whose information is saved in the authentication requesters list in association with the account information of the user targeted for deletion.

2. The authentication server according to claim 1, wherein the account information includes identification information of a user and location information of the user.

3. The authentication server according to claim 1, wherein the at least one program comprises program code that, when executed by the processor, further implements:
a deletion failure list save unit configured to, in a case where a response indicating successful deletion of the account information of the user targeted for deletion is not received from the device to which the deletion request was issued, save information of the device in a deletion failure list in association with the account information of the user targeted for deletion; and
a redeletion unit configured to issue, to the device whose information is saved in the deletion failure list in association with the account information of the user targeted for deletion, a deletion request to delete the account information of the user targeted for deletion.

4. The authentication server according to claim 3, wherein the redeletion unit is configured to periodically issue the deletion request.

5. The authentication server according to claim 3, wherein the redeletion unit, in a case where a request for new user authentication is received and information of a device that requested the new user authentication is registered in the deletion failure list, issues to the device a request to delete the saved information of the device in the deletion failure list.

6. An authentication server that performs user account maintenance and user authentication, the authentication server comprising:
a storage unit configured to store a user authentication table in which user account information is registered;
a processor; and
a memory that stores at least one computer program executable by the processor, the at least one computer program comprising program code that, when executed by the processor, implements:
a save unit configured to, in response to a request for user authentication, save information of a device that requests the user authentication in an authentication requesters list in association with account information of a user that requested the user authentication; and
a change unit configured to, in response to a user account information change request, change account information of a user targeted for change in the user authentication table and issue a change request to change information related to the user targeted for change to a device whose information is saved in the authentication requesters list in association with the account information of the user targeted for change.

7. The authentication server according to claim 6, wherein the account information includes identification information and location information of the user.

8. The authentication server according to claim 6, wherein the at least one computer program comprises program code that, when executed by the processor, further implements:

a change failure list save unit configured to, in a case where a response indicating successful change of the account information of the user targeted for change is not received from the device to which the change request was issued, save information of the device in a change failure list in association with the account information of the user targeted for change; and a rechange unit configured to issue, to the device whose information is saved in the change failure list in association with the account information of a user targeted for change, a change request to change the account information of the user targeted for change.

9. The authentication server according to claim 8, wherein the rechange unit is configured to periodically issue the change request.

10. The authentication server according to claim 8, wherein the rechange unit, in a case where a request for new user authentication is received and information of a device that requested the new user authentication is registered in the change failure list, issues to the device a request to change the saved information of the device in the change failure list.

11. An authentication system comprising:
an authentication server configured to perform user account maintenance and user authentication; and
a terminal device configured to be connected to the authentication server to which a user on the terminal device inputs an authentication request,
wherein the authentication server includes:
a storage unit configured to store a user authentication table in which user account information is registered;
a processor; and
a memory that stores at least one computer program executable by the processor, the at least one computer program comprising program code that, when executed by the processor, implements:
a save unit configured to, in response to a request for user authentication, save information of a device that requests the user authentication in an authentication requesters list in association with account information of a user that requested the user authentication; and
a deletion unit configured to, in response to a user account information deletion request, delete account information of a user targeted for deletion from the user authentication table and issue a deletion request to delete information related to the user targeted for deletion to a device whose information is saved in the authentication requesters list in association with the user targeted for deletion; and
a change unit configured to, in response to a user account information change request, change account information of a user targeted for change in the user authentication table and issue a change request to change information related to the user targeted for change to a device whose information is saved in the authentication requesters list in association with the user targeted for change,
wherein the terminal device is configured to, on receipt of the deletion request, delete the account information of the user targeted for deletion and, if successful, transmit a response of successful deletion to the authentication server, and
wherein the terminal device is configured to, on receipt of the change request, change the account information of the user targeted for change and, if successful, transmit a response of successful change to the authentication server.

12. An account maintenance method in an authentication server that performs user account maintenance and user authentication, the method comprising:
saving, in response to a request for user authentication, information of a device that requests the user authentication in an authentication requesters list in association with account information of a user that requested the user authentication;
deleting, in response to a user account information deletion request, account information of a user targeted for deletion from a user authentication table in which the account information is registered; and
issuing a deletion request to delete information related to the user targeted for deletion to a device whose information is saved in the authentication requesters list in association with the account information of the user targeted for deletion.

13. An account maintenance method in an authentication server that performs user account maintenance and user authentication, the method comprising:
saving, in response to a request for user authentication, information of a device that requests the user authentication in an authentication requesters list in association with account information of a user that requested the user authentication;
changing, in response to a user account information change request, account information of a user targeted for change in a user authentication table in which the account information is registered; and
issuing a change request to change information related to the user targeted for change to a device whose information is saved in the authentication requesters list in association with the user targeted for change.

14. A non-transitory computer-readable storage medium storing a computer program for causing a computer to execute an account maintenance method comprising:
saving, in response to a request for user authentication, information of a device that requests the user authentication in an authentication requesters list in association with account information of a user that requested the user authentication;
deleting, in response to a user account information deletion request, the account information of a user targeted for deletion from a user authentication table in which the account information is registered; and
issuing a deletion request to delete information related to the user targeted for deletion to a device whose information is saved in the authentication requesters list in association with the user targeted for deletion.

15. A non-transitory computer-readable storage medium storing a computer program for causing a computer to execute an account maintenance method comprising:
saving, in response to a request for user authentication, information of a device that requests the user authentication in an authentication requesters list in association with account information of a user that requested the user authentication;
changing, in response to a user account information change request, account information of a user targeted for change in a user authentication table in which the account information is registered; and
issuing a change request to change information related to the user targeted for change to a device whose information is saved in the authentication requesters list in association with the user targeted for change.

* * * * *